July 5, 1932.　　W. G. KIRCHHOFF　　1,866,213
DOUGH WORKING DEVICE
Filed May 9, 1928　　4 Sheets-Sheet 4

Inventor
William G. Kirchhoff,
By
Attorneys.

Patented July 5, 1932

1,866,213

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

DOUGH WORKING DEVICE

Application filed May 9, 1928. Serial No. 276,304.

This invention relates to an auxiliary dough molder adapted for use in connection with a primary dough molder of any approved type, for example, such as is disclosed in my co-pending application for a dough molder filed February 24, 1925 and serially numbered 11,086.

An object of this invention is to provide an auxiliary dough molding device provided with positive means for effecting discharge of a molded loaf from a primary molder to an auxiliary molder.

Another object is to provide means for the purpose stated, which is simple and effective.

These and other objects are attained by the means described herein and disclosed in the accompanying drawings, in which.

Figure 1:
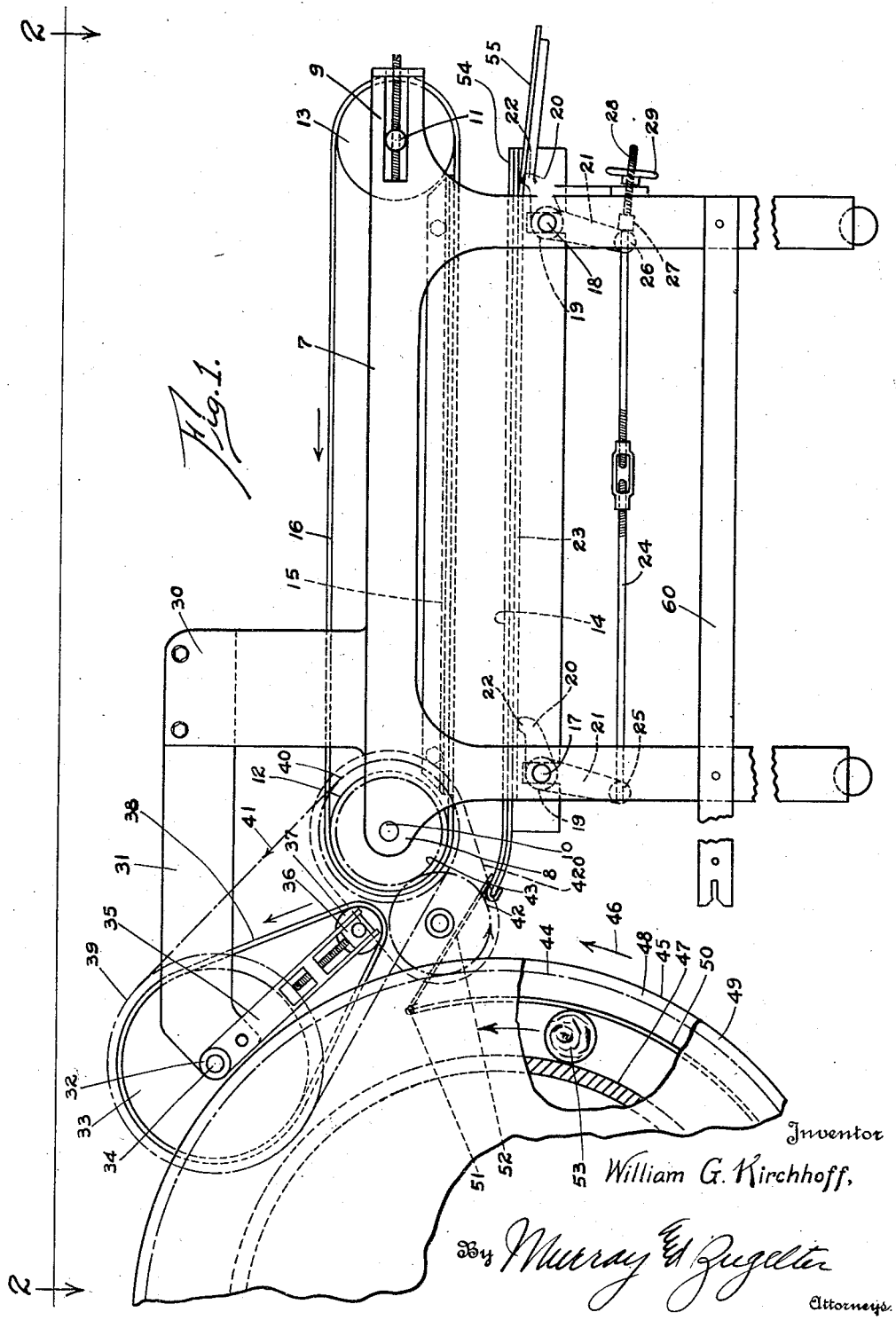
Fig. 1 is a side elevational view of the device embodying the invention.
Figure 2:
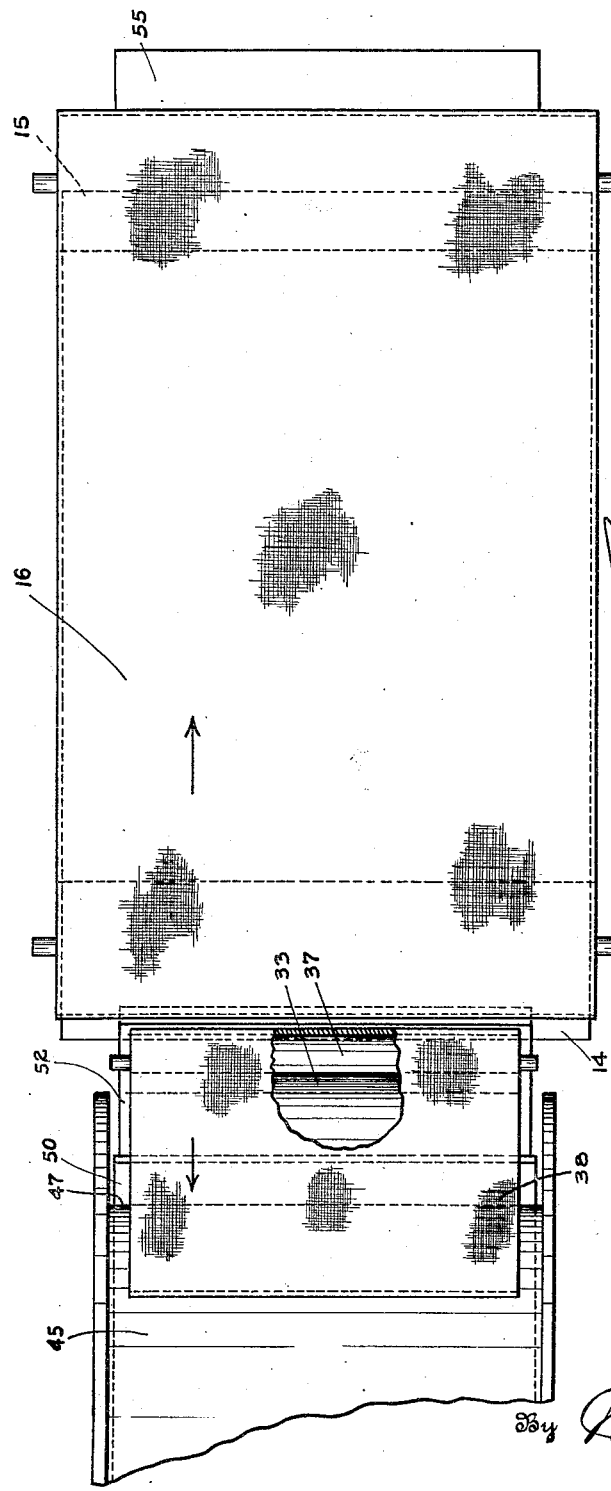
Fig. 2 is a plan view taken on line 2—2 of Fig. 1 showing diagrammatically the relationship of parts.

The device of this invention comprises a frame 7 provided with suitable bearings 8 and 9 which receive shafts 10 and 11 respectively, upon which are rotatably mounted conveyor rolls 12 and 13. In each embodiment of the invention, the frame 7 is provided with an adjustable pressure board 14, a fixed pressure board 15, and a conveyor belt 16 extending about the conveyor rolls. A means is provided for adjusting the pressure board 14 comprising shafts 17 and 18 each carrying a pair of cranks 19 provided with arms 20 and 21. Each of the arms 20 is provided with an extending lug 22 adapted to abut the lower face 23 of the pressure board for retaining said board in adjusted positions relative to conveyor belt 16. The pressure board is raised or lowered by simultaneously actuating the cranks 19 which are fixedly secured on shafts 17 and 18. The lower ends of arms 21 are connected by means of a rod 24 having pivotal mountings at 25 and 26. A universal joint 27 provides a connection between the rod 24 and a nonrotatable screw 28 upon which is mounted a hand wheel 29. Rotation of the hand wheel serves to reciprocate the rod 24 for adjusting the pressure board.

In the device disclosed by Fig. 1 of the drawings, an upwardly extending bracket 30 is shown supporting an arm 31 provided at its free end with a bearing 32 which rotatably supports conveyor roller 33 mounted on a shaft 34. An arm 35, bolted or otherwise secured upon arm 31, is provided at one end with an adjustable bearing block 36 in which is rotatably mounted a conveyor roller 37. A conveyor belt 38 extends about the conveyor rolls 33 and 37 which are driven in a counter clockwise direction by means of sprockets 39 and 40 connected by chain 41. Sprocket 39 is rotatable with roller 33 and sprocket 40 is rotatable with conveyor roller 12. Rotatory motion is imparted to conveyor roller 12 by means of an idler gear 42 meshing with gears 43 and 44 mounted on shaft 10 and drum 45 of a primary molder, respectively. Idler gear 42 may be rotatably mounted in a suitable gear casing 420.

As indicated by arrow 46, the drum 45 of the primary molder rotates in a counter clockwise direction. Said drum comprises a cylindrical rolling surface 47 provided at each end with confining flanges 48 and 49. A resilient arcuate pressure board 50 is disposed between the said flanges and spaced from the cylindrical member 47. Said pressure board is adapted to yieldingly apply pressure upon a mass of dough passing through the primary molder. At the upper end 51 of pressure board 50 is pivotally mounted a discharge sheet 52 upon which dough is discharged from the primary molder. Numeral 53 indicates a cylindrical mass of dough about to be discharged from the primary molder onto the discharge sheet. The mass of dough upon reaching the end 51 of the pressure board 50, contacts the downwardly moving conveyor belt 38 and is positively projected toward the conveyor belt 16 and pressure plate 14. The mass of dough, after passing along the pressure plate 14, is discharged at the end 54 thereof onto a discharge table 55.

Figure 3:
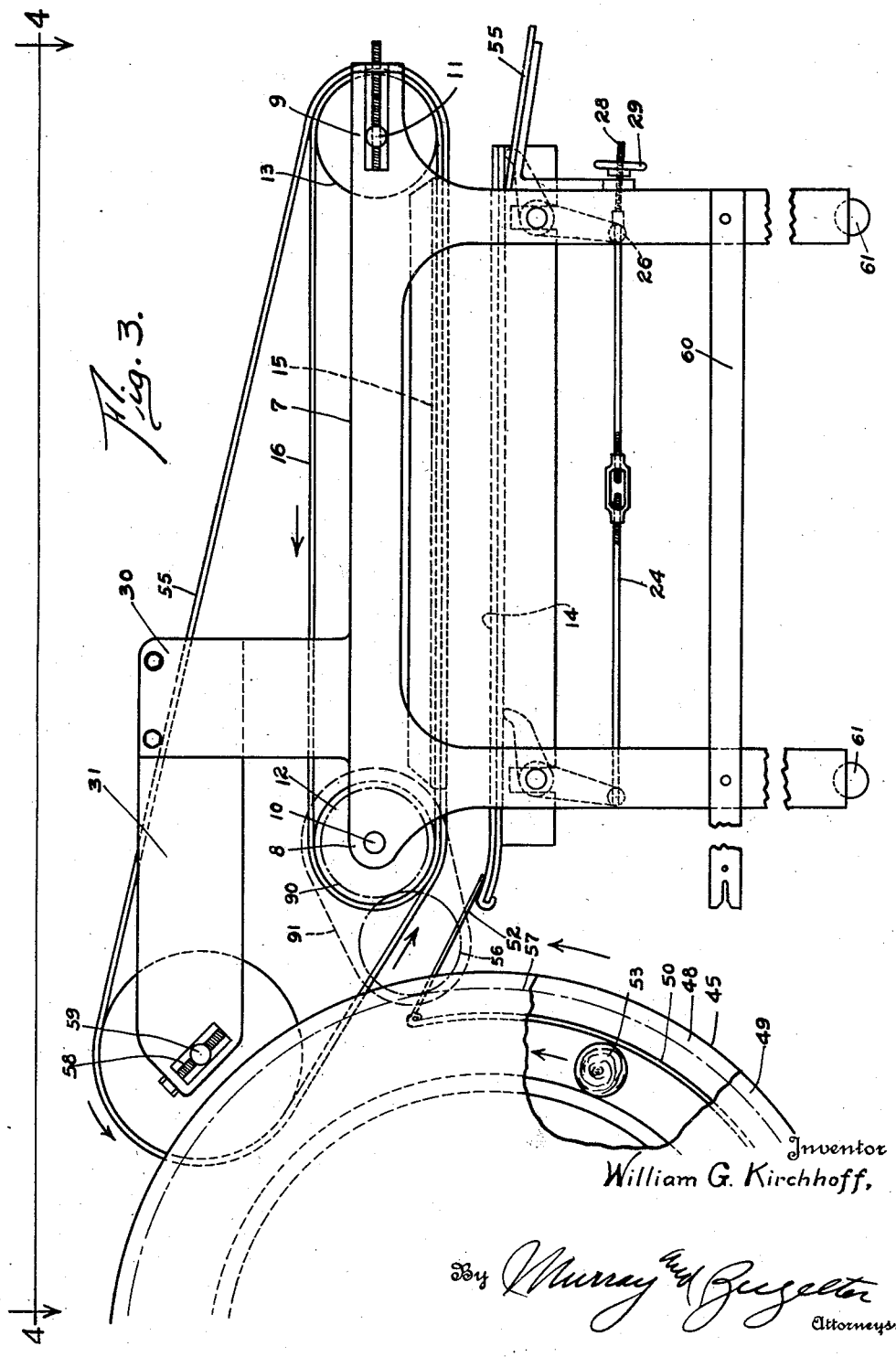
Fig. 3 is a side elevational view of a modified form of the device of this invention.
Figure 4:
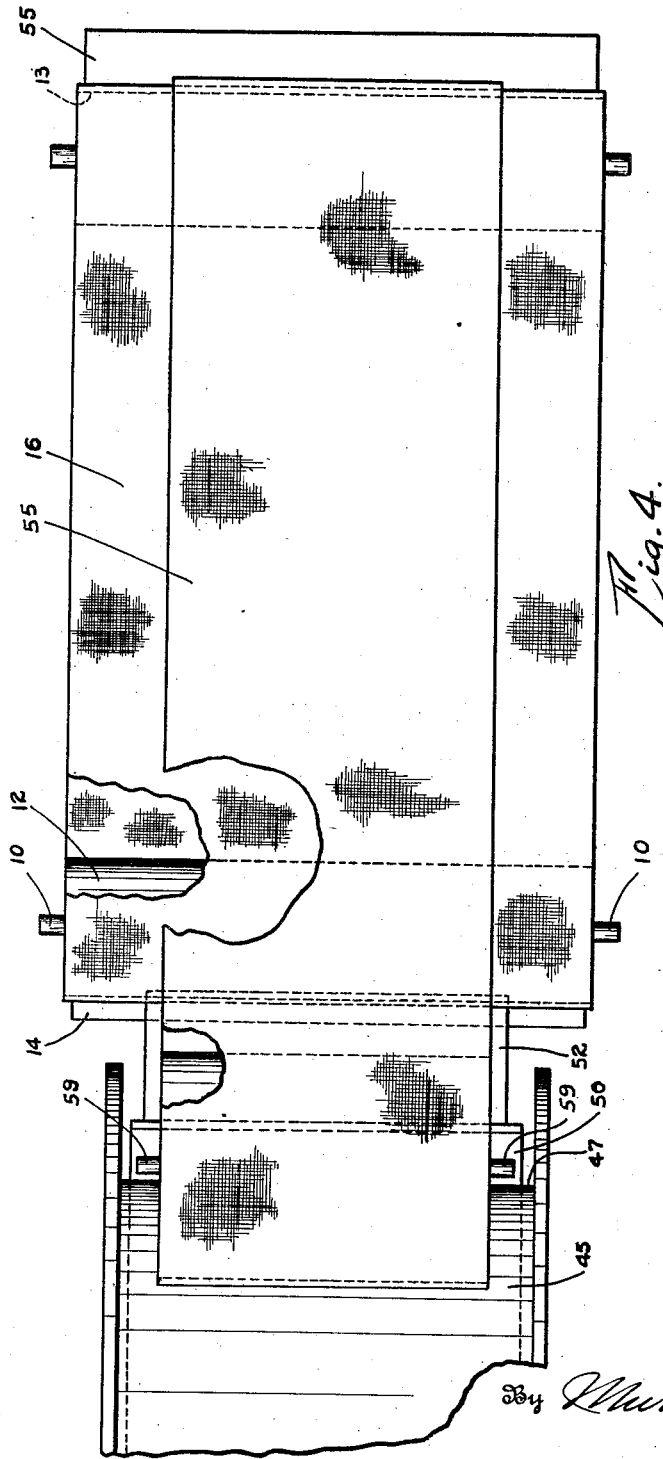
Fig. 4 is a plan view taken on line 4—4 of Fig. 3 showing diagrammatically the relationship of parts.

In the modified form of the device disclosed in Fig. 3, there is shown a conveyor belt 55 which performs the same function as conveyor belt 38 of the embodiment shown in Fig. 1. The conveyor belt 55, however, requires no separate driving means, said belt being driven by the frictional contact thereof upon conveyor belt 16 which latter is driven by means of an idler gear 56 engaging a gear 57 rotatable with the drum 45 of the primary molder, and a gear 90 fixedly mounted upon roller shaft 10. Idler gear 56 may be rotatably mounted in a gear casing 91 secured, preferably to the auxiliary molder. Means comprising a screw 58 passing through a threaded bearing block 59 is utilized for adjusting the tension of belt 55. The cylindrical mass of dough 53 is projected onto the pressure plate 14 in a manner similar to that described in the first embodiment of the device.

The operation of the device is as follows.

In each embodiment of the invention the auxiliary molder is disposed adjacent the primary molder and held in position by any suitable means, such as a connecting bar 60. By this arrangement, the belts 55 and 38, of the device shown in Figs. 3 and 1 respectively, are disposed in close proximity with the rolling surface 47 of drum 49. As shown in the drawings, a mass of plastic dough is inserted between the rolling surface of the drum and pressure board 50 of the primary molder, wherein the mass of dough is formed into an elongated cylindrical body 53. As the body 53 is rolled between the pressure board and rolling surface of the drum, it reaches the point 51, from whence it is discharged from the primary molder. Positive discharge of the molded body is effected by means of the belts 38 and 55 moving in the direction indicated by the arrows. It is to be understood that in the making of bread, the various machines utilized are regulated or timed to operate on masses of dough passing consecutively through the dough working machine. By means of the device of this invention positive discharge of the molded loaf from the primary molder to the secondary molder is effected, thereby maintaining a given sequence of molded loaves. Heretofore, gravity was depended upon to transfer the loaf. It should be noted that the conveyor belt 16 of the auxiliary molder is of greater width than the drum of the primary molder. The use of the wide belt 16 permits of further elongation of the cylindrical body 53 after leaving the primary molder.

Rollers 61 may be provided for facilitating moving the device toward and from its position relative to the primary molder.

It is to be understood that various modifications may be made in the structural details of the device, without departing from the spirit of the invention.

What is claimed is:

1. An auxiliary dough molder comprising a frame, a movable conveyor means mounted on the frame, a pressure board mounted on the frame and spaced from the conveyor means, a support means on the frame, a conveyor roller rotatably mounted on the support means, and a conveyor belt passing about the said conveyor roller and having frictional contact with the first mentioned conveyor means, whereby movement of the first mentioned conveyor means may be imparted to the second conveyor belt and roller.

2. The combination with a primary dough molder comprising a drum and cooperative pressure board, an auxiliary dough molder for receiving and operating upon partly molded loaves formed by the primary molder and comprising a moving conveyor belt and cooperating pressure boards, of means completely encircling the said conveyor belt for removing the partly molded loaves from the primary molder and transferring said loaves to the auxiliary molder.

3. The combination with a primary dough molder comprising a drum and cooperative pressure board, an auxiliary dough molder for receiving and operating upon partly molded loaves formed by the primary molder and comprising a moving conveyor belt and cooperating pressure boards, of a second conveyor belt contacting the first mentioned conveyor belt and adapted for movement adjacent the primary molder drum for contacting the partly molded loaf and positively directing it to the belt and pressure board of the auxiliary molder.

4. In an auxiliary dough molder, the combination with a frame, of a pair of conveyor rolls rotatably mounted on the frame, an endless conveyor belt passing about the rolls, a stationary and a movable pressure board positioned adjacent the conveyor belt and cooperating therewith for shaping dough loaves, a pair of extending arms on the frame, a conveyor roll rotatably supported on the arms, an endless conveyor belt passing about the conveyor roll and the first mentioned conveyor belt whereby motion of the first mentioned conveyor belt may be imparted to the second conveyor belt, and means whereby the frame and conveyor means may be retained in position relative to a primary molder.

In testimony whereof, I have hereunto subscribed my name this 8th day of May, 1928.

WILLIAM G. KIRCHHOFF.